United States Patent
Paradis

(10) Patent No.: US 11,440,465 B2
(45) Date of Patent: Sep. 13, 2022

(54) REDUCTION OF CONSTANT ILLUMINATION SECTION AREA BY INDIRECT ILLUMINATION OF SEQUENTIAL ILLUMINATION SECTION AREA

(71) Applicant: Toyota Motor Engineering & Manufacturing North America, Inc., Plano, TX (US)

(72) Inventor: Alexander L. Paradis, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 6 days.

(21) Appl. No.: 17/161,781

(22) Filed: Jan. 29, 2021

(65) Prior Publication Data
US 2022/0242306 A1 Aug. 4, 2022

(51) Int. Cl.
*B60Q 1/38* (2006.01)
*F21S 43/14* (2018.01)
*F21Y 115/10* (2016.01)

(52) U.S. Cl.
CPC .............. *B60Q 1/38* (2013.01); *F21S 43/14* (2018.01); *F21Y 2115/10* (2016.08)

(58) Field of Classification Search
CPC .................................. B60Q 1/38; F21S 43/14
USPC ........................................................ 340/475
See application file for complete search history.

(56) References Cited

U.S. PATENT DOCUMENTS

| | | | |
|---|---|---|---|
| 6,677,856 B2* | 1/2004 | Perlman | B60Q 1/26 340/475 |
| 7,791,465 B1* | 9/2010 | El-Massry | B60Q 1/503 340/478 |
| 8,310,357 B2 | 11/2012 | Beach et al. | |
| 8,398,284 B1* | 3/2013 | Dvorzsak | F21S 43/14 362/249.02 |
| 10,100,984 B2 | 10/2018 | Dubuc et al. | |
| 10,352,519 B2 | 7/2019 | Shin et al. | |
| 2006/0133103 A1* | 6/2006 | Muhlbaier | B60Q 1/2607 362/545 |
| 2009/0051522 A1* | 2/2009 | Perkins | B60Q 1/2603 362/545 |
| 2010/0124073 A1* | 5/2010 | Kowalczyk | F21S 43/14 362/545 |
| 2015/0308650 A1 | 10/2015 | De Kievit et al. | |
| 2017/0113605 A1* | 4/2017 | Daicho | F21S 43/195 |
| 2022/0134945 A1* | 5/2022 | Hoffman | B60Q 1/343 340/907 |

FOREIGN PATENT DOCUMENTS

WO  2016171631 A1  10/2016

* cited by examiner

*Primary Examiner* — Bryon T Gyllstrom
(74) *Attorney, Agent, or Firm* — Dinsmore & Shohl LLP

(57) ABSTRACT

A lighting system for a vehicle includes a sequential illumination section including multiple illumination segments, and a constant illumination section. The multiple illumination segments of the sequential illumination portion activate or deactivate sequentially, and the constant illumination section illuminates at least a portion of the sequential illumination section when all of the multiple illumination segments are deactivated.

11 Claims, 3 Drawing Sheets

REDUCTION OF CONSTANT ILLUMINATION SECTION AREA BY INDIRECT ILLUMINATION OF SEQUENTIAL ILLUMINATION SECTION AREA

TECHNICAL FIELD

The present specification generally relates to illumination of lamps for vehicles and, more specifically, to sequentially illuminating lamps for vehicles.

BACKGROUND

A vehicle may have front and rear turn lamps which may indicate an upcoming turn of the vehicle. Characteristics of these lamps may be subject to regulation by various regulatory bodies. For example, certain regulatory bodies may require illumination using a particularly sized lamp and/or to a particular level of illumination (e.g., number of lumens). Additionally, turn lamps may be one portion of a lamp assembly, which may include other lamps such as, for example, head lamps and daytime running lamps ("DRL"). Portions of the lamp assembly may be subject to design constraints based on multiple factors including regulatory requirements and customer preference. Accordingly, lamps that satisfy both regulatory requirements and customer preference are required.

SUMMARY

In one embodiment, a lighting system for a vehicle includes a sequential illumination section including multiple illumination segments, and a constant illumination section. The multiple illumination segments of the sequential illumination portion activate or deactivate sequentially, and the constant illumination section illuminates at least a portion of the sequential illumination section when all of the multiple illumination segments are deactivated.

In another embodiment, a vehicle includes a lighting system that includes a sequential illumination section including multiple illumination segments and a constant illumination section. The multiple illumination segments of the sequential illumination portion activate or deactivate sequentially, and the constant illumination section illuminates at least a portion of the sequential illumination section when all of the multiple illumination segments are deactivated.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
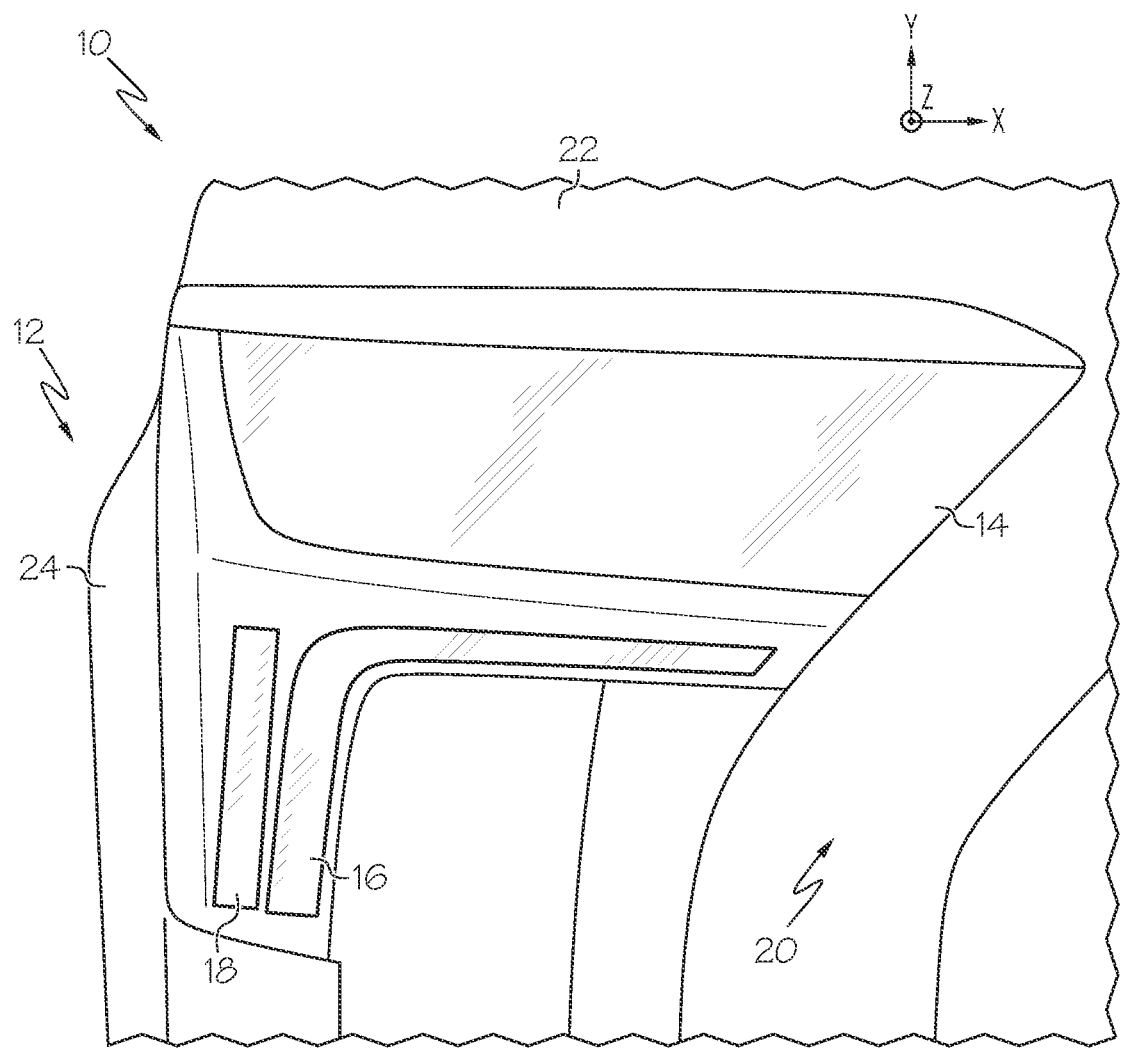
FIG. 1 depicts a front view of a vehicle that includes a lighting system including a turn lamp, according to one or more embodiments described herein.

FIG. 1 generally depicts a vehicle including a turn lamp of the vehicle. The turn lamp may be used to indicate, for example, an intention of a driver or system controlling the movement of the vehicle to execute a turn in the vehicle. The turn lamp may include multiple illumination segments that deactivate or activate sequentially. The turn lamp may further include at least one direct illumination turn segment that indirectly illuminates at least one of the multiple turn segments to increase illuminated area.

Referring to FIG. 1, a vehicle 10 is shown. The vehicle 10 may include one or more lamps used to illuminate an area around the vehicle and/or to demonstrate a status of the vehicle 10 (e.g., a turn status). The vehicle 10 may include, for example, a headlamp assembly 12 that may include one or more headlamps 14, and one or more forward turn lamps 16, and one or more daylight running lamps (DRL) 18. The vehicle 10 may further include a grill assembly 20, a hood 22, and a bumper 24. Embodiments of the vehicle 10 may include various components (e.g., a body, wheels, other lamps, etc.) that are not depicted in FIG. 1 for simplicity. For example, the vehicle 10 may include one or more rear turn lamps. It is to be understood that the principles of the embodiments disclosed herein can apply to vehicles having different types and arrangements of lamps as the vehicle 10 that is specifically depicted without departing from the scope of the present application.

As mentioned, the headlamp assembly 12 includes the headlamp 14, the forward turn lamp 16, and the DRL 18. In some embodiments, the headlamp assembly 12 may be configured between the bumper 24 and the grill assembly 20 and the forward turn lamp 16 may generally occupy a space between the DRL 18 and the grill assembly 20. For various reasons (e.g., space restrictions, customer preference, etc) it may be desirable to have a DRL 18 of a particular size and a grill assembly 20 of a particular size, which may leave only a limited area for the frontal aspect of the forward turn lamp 16. This limited area may affect the design and layout of the forward turn lamp 16 as described herein.

Referring now to FIGS. 1 and 2A-2J, a sequential illumination pattern for a lighting system 100 for the vehicle 10 of FIG. 1 is schematically depicted. The lighting system 100 may be implemented using for example, the forward turn lamp 16 of FIG. 1. Other turn lamps of the vehicle 10 may operate substantially similarly to the lighting system 100.

The lighting system 100 includes a sequential illumination section 102 and a constant illumination section 104. The sequential illumination section 102 includes illumination segments 106-118. As depicted, the sequential illumination section includes seven illumination segments, but it is to be understood that embodiments may include more or fewer illumination segments (e.g., two, three, eight, etc.) without deviating from the scope of the instant application. As will be described in greater detail herein, an illumination segment generally includes a bulb or light (e.g., a PCB-printed LED) and a reflector (e.g., mirror) for reflecting the light generated within the segment out of the lamp.

Figure 2A:
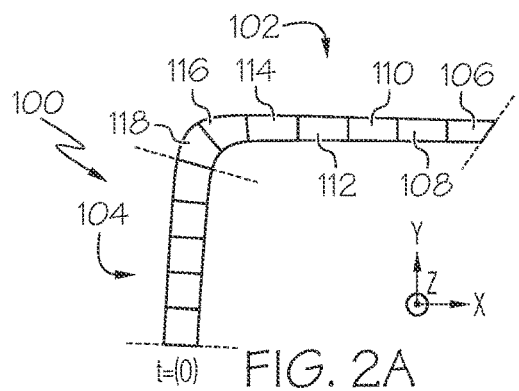
FIG. 2A depicts one segment of an illumination sequence of the turn lamp of the lighting system of the vehicle of FIG. 1, according to one or more embodiments shown and described herein.
Figure 2B:
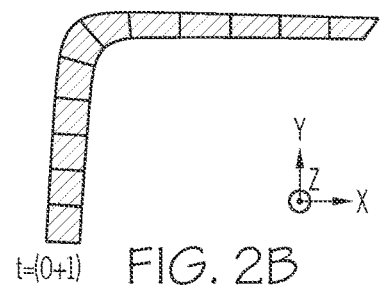
FIG. 2B depicts another segment of an illumination sequence of the turn lamp of the lighting system of the vehicle of FIG. 1, according to one or more embodiments shown and described herein.
Figure 2C:
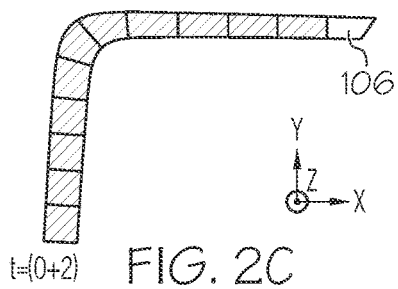
FIG. 2C depicts another segment of an illumination sequence of the turn lamp of the lighting system of the vehicle of FIG. 1, according to one or more embodiments shown and described herein.
Figure 2D:
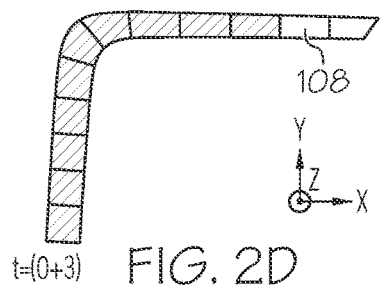
FIG. 2D depicts another segment of an illumination sequence of the turn lamp of the lighting system of the vehicle of FIG. 1, according to one or more embodiments shown and described herein.
Figure 2E:
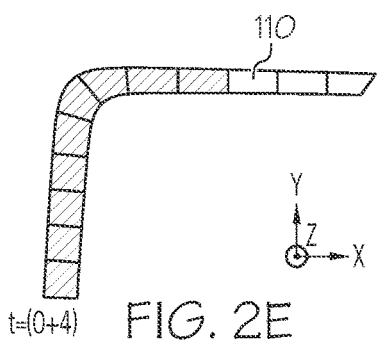
FIG. 2E depicts another segment of an illumination sequence of the turn lamp of the lighting system of the vehicle of FIG. 1, according to one or more embodiments shown and described herein.
Figure 2F:
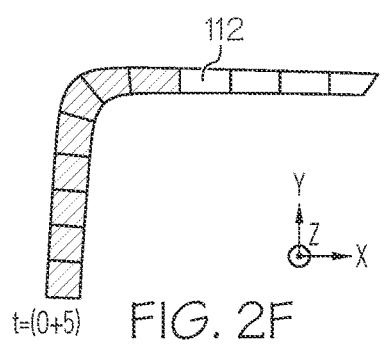
FIG. 2F depicts another segment of an illumination sequence of the turn lamp of the lighting system of the vehicle of FIG. 1, according to one or more embodiments shown and described herein.
Figure 2G:
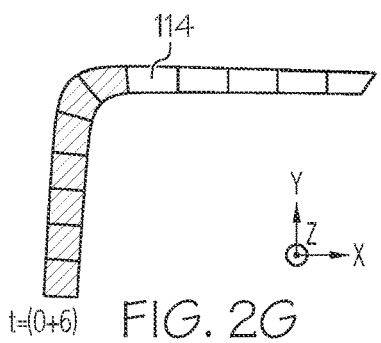
FIG. 2G depicts another segment of an illumination sequence of the turn lamp of the lighting system of the vehicle of FIG. 1, according to one or more embodiments shown and described herein.
Figure 2H:
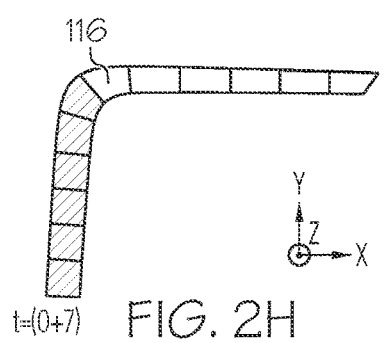
FIG. 2H depicts another segment of an illumination sequence of the turn lamp of the lighting system of the vehicle of FIG. 1, according to one or more embodiments shown and described herein.
Figure 2I:
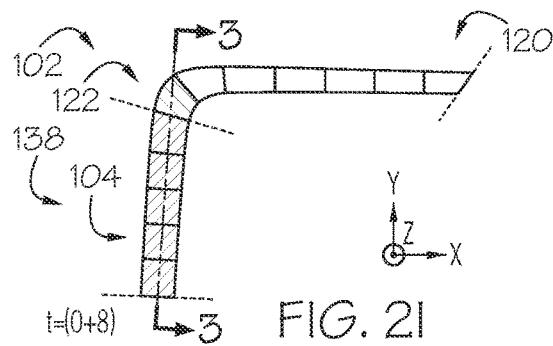
FIG. 2I depicts another segment of an illumination sequence of the turn lamp of the lighting system of the vehicle of FIG. 1, according to one or more embodiments shown and described herein.
Figure 2J:
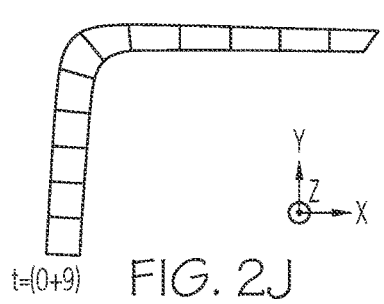
FIG. 2J depicts another segment of an illumination sequence of the turn lamp of the lighting system of the vehicle of FIG. 1, according to one or more embodiments shown and described herein.

The sequential illumination section 102 may include a direct illumination portion 120 (FIG. 2I) and an indirect illumination portion 122 (FIG. 2I). In the depicted embodiment, the direct illumination portion 120 includes all the illumination segments of the sequential illumination section 102 and the indirect illumination portion 122 includes the illumination segment 118. The direct illumination portion 120 and the indirect illumination portion 122 are described in greater detail herein.

Still referring to FIGS. 1 and 2A-2J, the constant illumination section 104 may include one or more illumination segments. While the depicted embodiment shows multiple illumination segments (not individually numbered in the figures) it is to be understood that embodiments may include only one illumination segment. Light from the constant illumination section 104 may illuminate the indirect illumination portion 122 of the sequential illumination section 102, which light may be visible to an external viewer when the sequential illumination section 102 is fully deactivated as described in greater detail herein.

Figure 3:
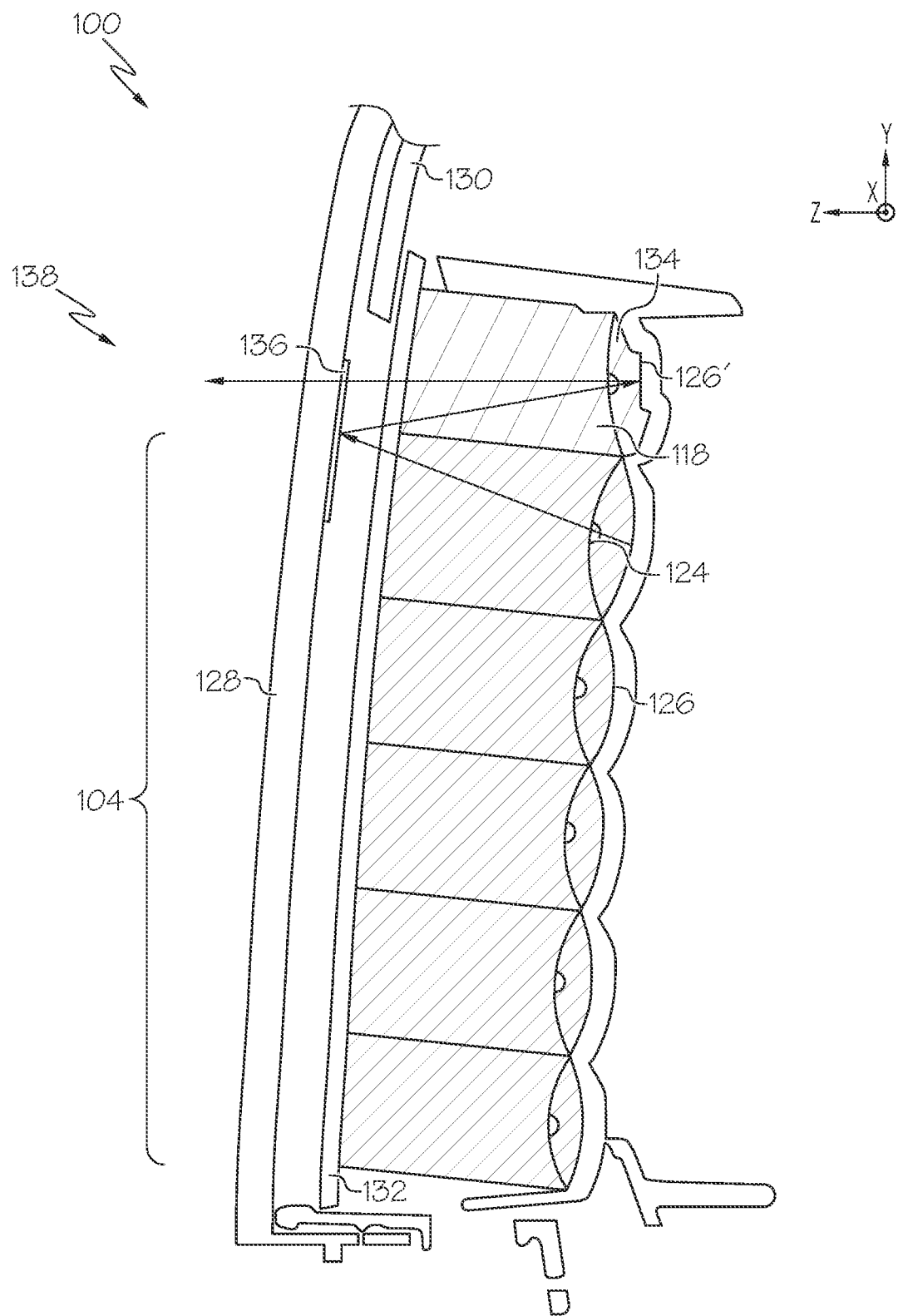
FIG. 3 schematically depicts a sectional side view of the turn lamp of FIG. 2 including an illumination diagram, according to one or more embodiments shown and described herein.

FIG. 3 schematically shows a portion of the lighting system 100 of FIGS. 2A-2J in greater detail. FIG. 3 depicts a portion of the lighting system 100 down the cross-sectional line 3 in FIG. 2I. FIG. 3 shows both the constant illumination section 104 and the illumination segment 118 of the sequential illumination section 102 of FIGS. 2A-2J. As shown in FIG. 3, the illumination segment 118 is deactivated and light from the constant illumination section 104 indirectly illuminates the illumination segment 118, which corresponds to FIG. 2I. FIG. 3 is shown in the Y-Z plane as compared with FIGS. 1 and 2A-2J, which depict the lighting system 100 in the X-Y plane.

Still referring to FIG. 3, each of the one or more of the illumination segments of the lighting system 100 include a light 124 and an external reflector 126. It is to be understood that "lights" does not limit the application to any particular source of illumination and that the lights 124 could be, for example, LEDs, incandescent bulbs, etc. In the depicted embodiment, the lights 124 are LED printed circuit boards 134 ("LED PCBs"). The lighting system 100 further includes a lens 128, bezel 130, and an inner lens 132. The lighting system 100 may further include an internally reflective surface 136. The internally reflective surface 136 may be configured to reflect light from one or more of the illumination segments to another of the illumination segments to make the another of the illumination segments appear as if it were illuminated. For example, the internally reflective surface 136 may reflect light from the constant illumination section 104 to the illumination segment 118 and the external reflector 126 of the illumination segment may reflect that light to make the illumination segment 118 appear illuminated, but at a lower intensity, as will be described in greater detail herein. In some embodiments, the internally reflective surface 136 may be an internal surface of the lens 128 and the light that reflects internally from the internal surface may simply be the light that would reflect based on the lens not being one hundred percent translucent (i.e., reflecting some light internally to the lamp). In other embodiments, the internally reflective surface 136 may be a mirror or other reflective surface that is installed to reflect the light internally.

Referring to FIGS. 2A-2J and 3, a turn signal pattern of the turn signal will be described. As described above, the sequential illumination section 102 includes the illumination segments 106-118. The illumination segments 106-118 of the sequential illumination section 102 can activate and deactivate by turning on or off the light in their respective illumination segment. Upon activation of the turn signal of the vehicle 10 (FIG. 1), the constant illumination section 104 and the illumination segments 106-118 are configured to activate (i.e., turn on) and deactivate (i.e., turn off) according to the turn signal pattern. The illumination segments 106-118 of the sequential illumination section 102 are configured to then deactivate sequentially according to the turn signal pattern.

FIG. 2A shows the lighting system 100 prior to the activation of the turn signal (t=0). All of the individual illumination segments are deactivated. Upon activation of the turn signal (t=0+1), each of the illumination segments activates as depicted in FIG. 2B. Subsequently, one illumination segment sequentially deactivates as the turn signal progresses. For example, in FIG. 2C, the illumination segment 106 is deactivated (t=0+2). In FIG. 2D, the illumination segments 108 and 106 are both deactivated (t=0+3). This pattern may continue until all of the illumination segments 106-118 are deactivated as shown in FIG. 2I.

The constant illumination section 104 continues to shine after the illumination segments 106-118 of the sequential illumination section 102 deactivate (t=0+8). As shown in FIG. 3, light from the constant illumination section 104 may reflect from the internal reflector 136 of the lighting system 100 into the illumination segment 118. This light may reflect off of the external reflector 126' of the illumination segment 118 and out of the lamp, causing the illumination segment to appear illuminated, albeit at a lower intensity. Hence, the constant illumination section 104 and the illumination segment 118 are optically coupled. Further, the light reflecting out of the illumination segment 118 may be sufficiently bright to an outside observer to make the entire illumination segment 118 appear as though it were directly illuminated but at a lower intensity. At time t=0+9, the turn signal pattern resets and the constant illumination section 104 and all of the individual illumination segments 106-118 deactivate.

Because the optical coupling of the constant illumination section 104 and the illumination segment 118, the constant illumination section 104 and the illumination segment 118 viewed from outside the vehicle 10 form an effective constant illumination area 138 (FIGS. 2I and 3). In some embodiments, the components of the lighting system 100 may be designed such that the size of the effective constant illumination area 138 may be greater than or equal to a regulatory minimum. For example, in some embodiments, the effective constant illumination area 138 may be greater than or equal to 22 cm^2. In some embodiments, the effective constant illumination area 138 may be greater than or equal to 50 cm^2. In yet other embodiments, the effective constant illumination area 138 may be greater than or equal to 75 cm^2.

In some embodiments of the lighting system 100, one or more individual illumination segments may be optically isolated from one another. For example, with reference to FIGS. 2H and 2I, the illumination segment 118 and the illumination segment 116 may be optically isolated such that light from the illumination segment 118 does not illuminate from the illumination segment 116. This may have the effect of further isolating the illumination segment 118 from the other illumination segments 106-114 in addition to the illumination segment 116. Thus, when the illumination segment 118 is illuminated, either directly (i.e., is itself activated) or indirectly (i.e., through the constant illumination section), the illumination segments 106-116 do not appear illuminated.

With reference to FIG. 3, in some embodiments, there is no internal reflector 136 and instead light from the constant illumination section 104 illuminates directly from one or more portions of the sequential illumination section 102. For example, light may emanate directly from the constant illumination section 104 through the lens 128 associated with the illumination segment 118 making the illumination segment 118 appear as though it is activated even though it may not be.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A lighting system for a vehicle comprising:
    a sequential illumination section including multiple illumination segments; and
    a constant illumination section, wherein
    the multiple illumination segments of the sequential illumination portion activate or deactivate sequentially, and
    the constant illumination section illuminates at least a portion of the sequential illumination section when all of the multiple illumination segments are deactivated.

2. The lighting system of claim 1, further comprising an internal reflector configured to reflect light from the constant illumination section to at least a portion of the sequential illumination section.

3. The lighting system of claim 1, wherein the sequential illumination section and the constant illumination section are illuminated by LED PCBs.

4. The lighting system of claim 1, wherein the sequential illumination section includes seven illumination segments.

5. The lighting system of claim 1, wherein the sequential illumination section includes a direct illumination portion and an indirect illumination portion and light from the indirect illumination portion is isolated from the direct illumination portion.

6. The lighting system of claim 5, wherein the constant illumination section and the indirect illumination portion comprise an effective constant illumination area and the effective constant illumination area is greater than 22 cm^2.

7. The lighting system of claim 5, wherein the constant illumination section and the indirect illumination portion comprise an effective constant illumination area and the effective constant illumination area is greater than 50 cm^2.

8. The lighting system of claim 5, wherein the indirect illumination portion comprises a single illumination segment.

9. A vehicle including a lighting system comprising:
    a sequential illumination section including multiple illumination segments;
    a constant illumination section, wherein
    the multiple illumination segments of the sequential illumination portion activate or deactivate sequentially, and
    the constant illumination section illuminates at least a portion of the sequential illumination section when all of the multiple illumination segments are deactivated.

10. The vehicle of claim 9, wherein the sequential illumination section includes a direct illumination portion and an indirect illumination portion and light from the indirect illumination portion is isolated from the direct illumination portion.

11. The vehicle of claim 10, wherein the constant illumination section and the indirect illumination portion comprise an effective constant illumination area and the effective constant illumination area is greater than 22 cm^2.

* * * * *